(12) United States Patent
Kawamoto et al.

(10) Patent No.: US 6,207,928 B1
(45) Date of Patent: Mar. 27, 2001

(54) CONSUMABLE ELECTRODE TYPE PULSE ARC WELDING METHOD

(75) Inventors: Atsuhiro Kawamoto, Kawanishi; Akira Nakagawa, Hyogo; Yoshiaki Tanaka, Osaka; Koji Hamamoto, Hyogo; Hidetoshi Oyama, Osaka; Akiko Ueda; Toshinori Hongu, both of Hyogo; Shigeki Yonemori, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/333,852

(22) Filed: Jun. 15, 1999

(30) Foreign Application Priority Data

Jun. 17, 1998 (JP) ................................................ 10-169657

(51) Int. Cl.[7] ............................................... B23K 9/09
(52) U.S. Cl. ............................... 219/130.51; 219/137 PS
(58) Field of Search ........................... 219/130.4, 130.31, 219/130.32, 130.33, 130.5, 130.51, 137 PS

(56) References Cited

U.S. PATENT DOCUMENTS

| | | | |
|---|---|---|---|
| 3,588,466 | * | 6/1971 | Daggett .............................. 219/130.4 |
| 4,390,954 | * | 6/1983 | Manning ............................ 219/130.5 |
| 4,507,543 | * | 3/1985 | Ukai et al. ....................... 219/130.51 |
| 4,560,857 | * | 12/1985 | Segawa et al. ................. 219/137 PS |
| 5,017,757 | * | 5/1991 | Kawai et al. ................... 219/130.51 |

* cited by examiner

Primary Examiner—Clifford C. Shaw
(74) Attorney, Agent, or Firm—Pearne & Gordon LLP

(57) ABSTRACT

In a consumable electrode type arc welding method, when short circuit shift welding is conducted at the start of an arc in the process of pulse arc welding and also when an inclinations of a rise or fall is decreased in the case of starting an arc in the process of pulse welding and also when an inclination of a short circuit current is increased, short circuit, which irregularly occurs at the start of an arc, can be released in a short period of time and the arc can be stabilized early. When the generation of a magnetic arc blow is suppressed, it becomes possible to form proper welding beads. Due to the foregoing, the efficiency of welding work can be enhanced.

4 Claims, 7 Drawing Sheets

CONSUMABLE ELECTRODE TYPE PULSE ARC WELDING METHOD

BACKGROUND OF THE INVENTION

1. Field of the Invention

The present invention relates to a consumable electrode type pulse arc welding method by which welding is conducted in such a manner that at least one of the welding current and the welding voltage is superimposed like pulses between a welding wire and a welding base metal (work).

2. Description of the Related Art

Conventionally, in this type pulse arc welding method, an arc of pulse arc welding is started by using the same pulse parameter as that of main welding from the start of welding.

However, when an arc of welding is started by the same pulse parameter as that of main welding, short circuit is irregularly caused because of an unstable arc at the start of arcing. Due to the foregoing, a period of time of short circuit is extended, and big pieces of spatter are generated, or the arc is suddenly cut off. Further, a change in the welding current per unit time at the rise and fall of pulses is so sharp that a value of the change is ±1000 to 1400 A/msec. Therefore, a magnetic arc blow occurs, and the arc becomes unstable. Accordingly, it is impossible to form proper welding beads.

SUMMARY OF THE INVENTION

The present invention has been accomplished to solve the above problems, and therefore an object of the present invention is to provide a consumable electrode type pulse arc welding method by which the occurrence of a magnetic arc blow is suppressed when short circuit, which has been irregularly caused in the process of starting an arc, is released in a short period of time, so that the arc can be prevented from cutting off and stabilized early and proper beads of welding can be formed.

In order to accomplish the above object, a consumable electrode type pulse arc welding method of the present invention comprises: a first step for setting the welding current at a value lower than that of main welding in a first period of time which is a predetermined period of time from the start of welding; and a second step for increasing a setting value of the welding current to a value of main welding after the first period of time has passed. In this consumable electrode type pulse arc welding method, until the first point at which a setting value of the welding current reaches a predetermined setting value in the second step, not pulse welding but short circuit shift welding is conducted.

Also, in this consumable electrode type pulse arc welding method, a consumable electrode type pulse arc welding method comprises: a first step for setting the welding current at a value lower than that of main welding in a first period of time which is a predetermined period of time from the start of an arc; and a second step for increasing a setting value of the welding current to a value of main welding after the first period of time has passed, wherein an inclination of pulses is decreased from the start of an arc to the end of the second step.

In a consumable electrode type pulse arc welding method, a predetermined voltage is added to the welding voltage setting value and the thus obtained welding voltage setting value is outputted.

In a consumable electrode type pulse arc welding method, an inclination of pulses is decreased in the second step after welding has passed through the first point.

In a consumable electrode type pulse arc welding method, an inclination of a short circuit current is increased in the case of short circuit in the second step.

DETAILED DESCRIPTION OF THE PREFERRED EMBODIMENTS

Now, a description will be given in more detail of preferred embodiments of the invention with reference to the accompanying drawings.

Figure 1:
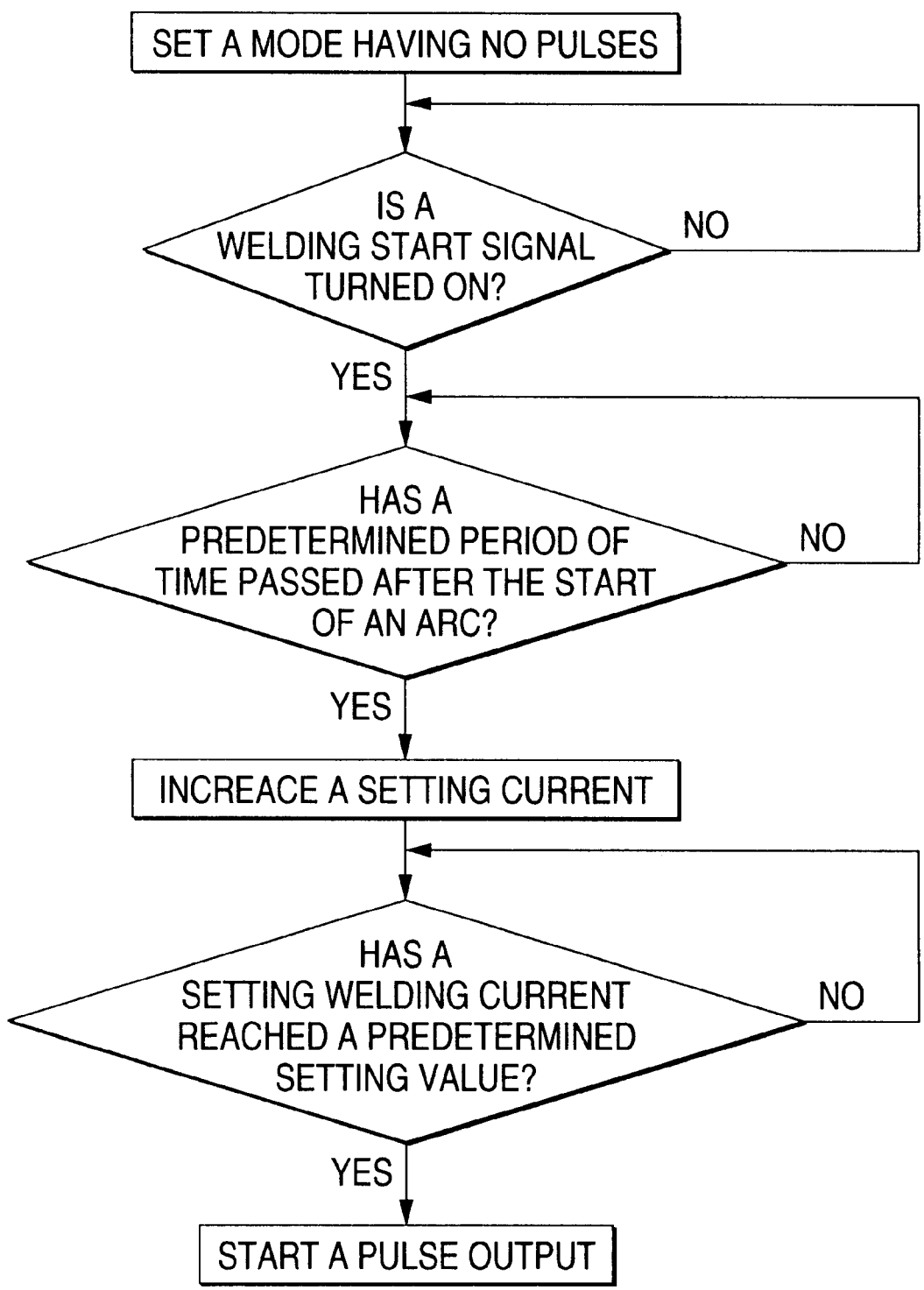
FIG. 1 is a flow chart at the start of welding of Embodiment 1 of the present invention.
Figure 2:
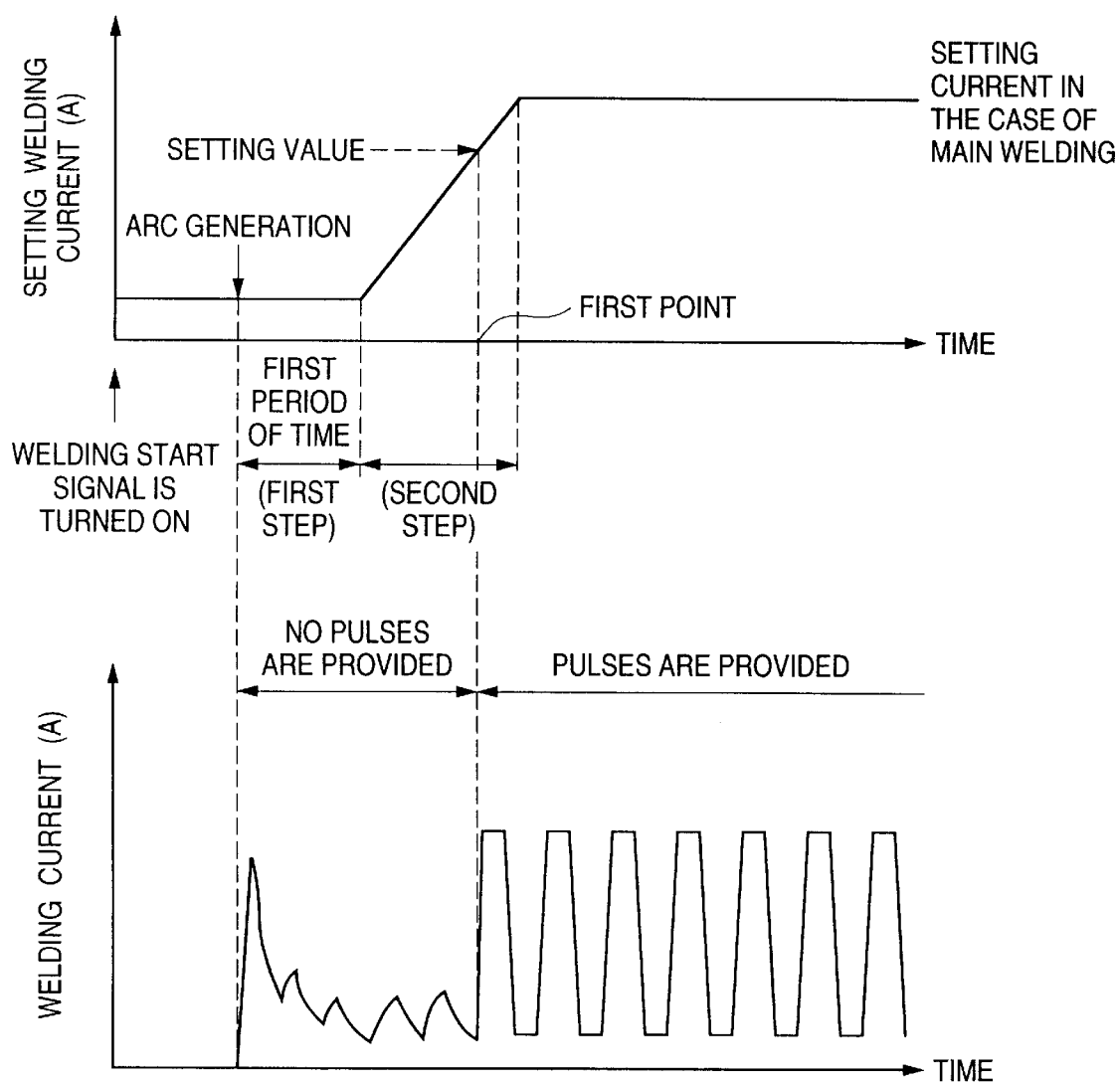
FIG. 2 is a time chart showing a setting welding current at the start of welding of Embodiment 1 of the present invention and a waveform showing a welding current of Embodiment 1.

FIG. 1 is a flow chart showing a consumable electrode type pulse arc welding method of Embodiment 1 of the present invention, and FIG. 2 is a time chart showing a setting welding current, with a diagram of a waveform of a welding current. In the process of waiting, a welding device is not set in a pulse welding condition but in a short circuit shift welding condition. Next, when a welding start signal is turned on, an arc is generated.

In this case, a first period of time is defined as a period of time from the start of the arc to a predetermined time, and a setting value of the welding current is set at a value lower than that of main welding until the first period of time has passed. This period of time is defined as a first step. A second step is defined as a period of time from a point of time at which the first period of time has passed to a point of time at which the setting value of welding is increased to a value of main welding. A first point is defined as a point of time at which the setting value of welding reaches a predetermined setting value in the second step. Pulse welding is started at this first point. That is, when short circuit shift welding is conducted until the welding current reaches the predetermined welding current, irregular short circuit occurring at the start of an arc can be released in a short period of time. Since it is a short circuit shift welding, a change in the welding current in the unit time is ±100 to 400 A/msec, which is not more than ½ of the welding current in the case of pulse welding. Therefore, it is possible to suppress the occurrence of a magnetic arc blow.

Figure 3:
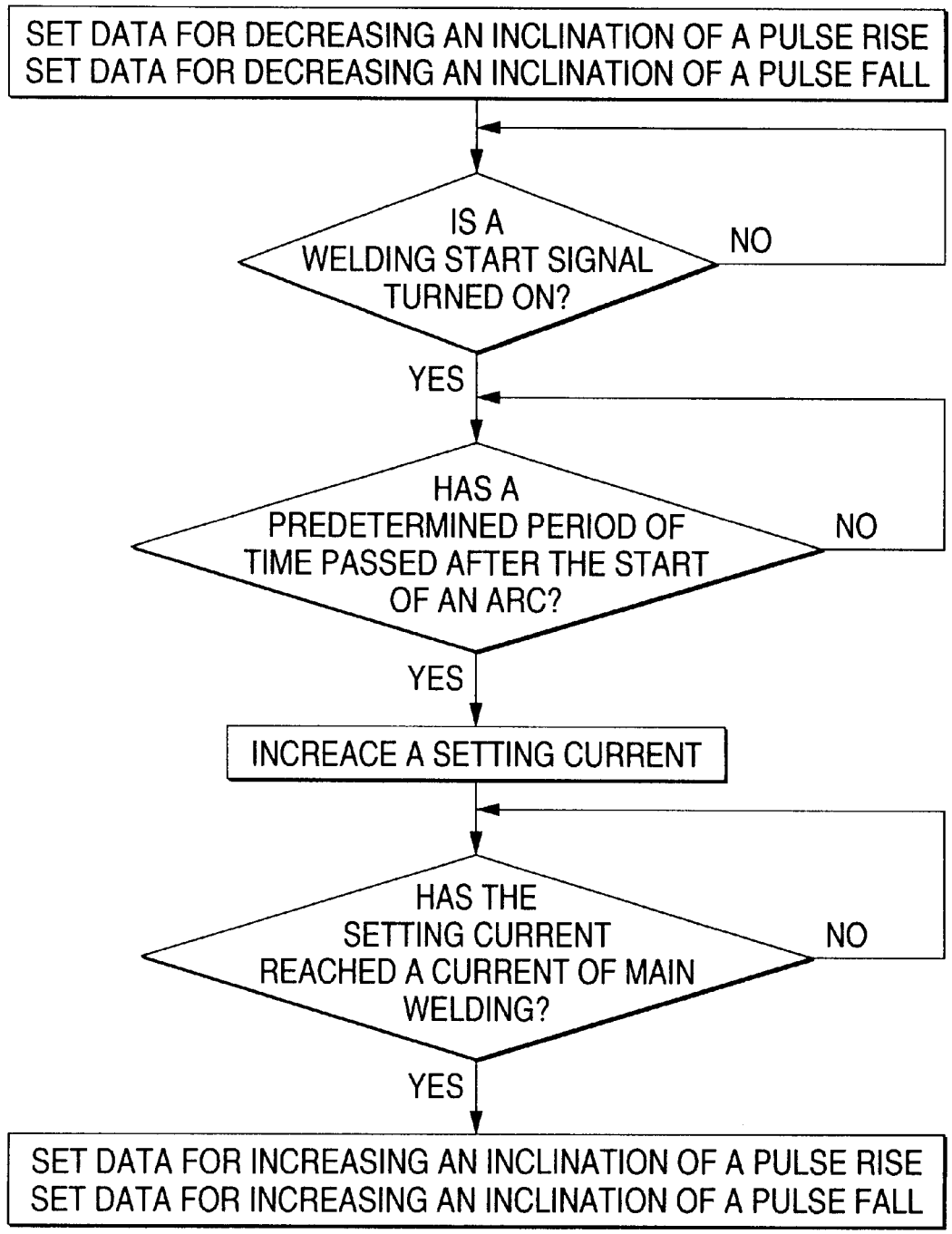
FIG. 3 is a flow chart at the start of welding of Embodiment 2 of the present invention.
Figure 4:
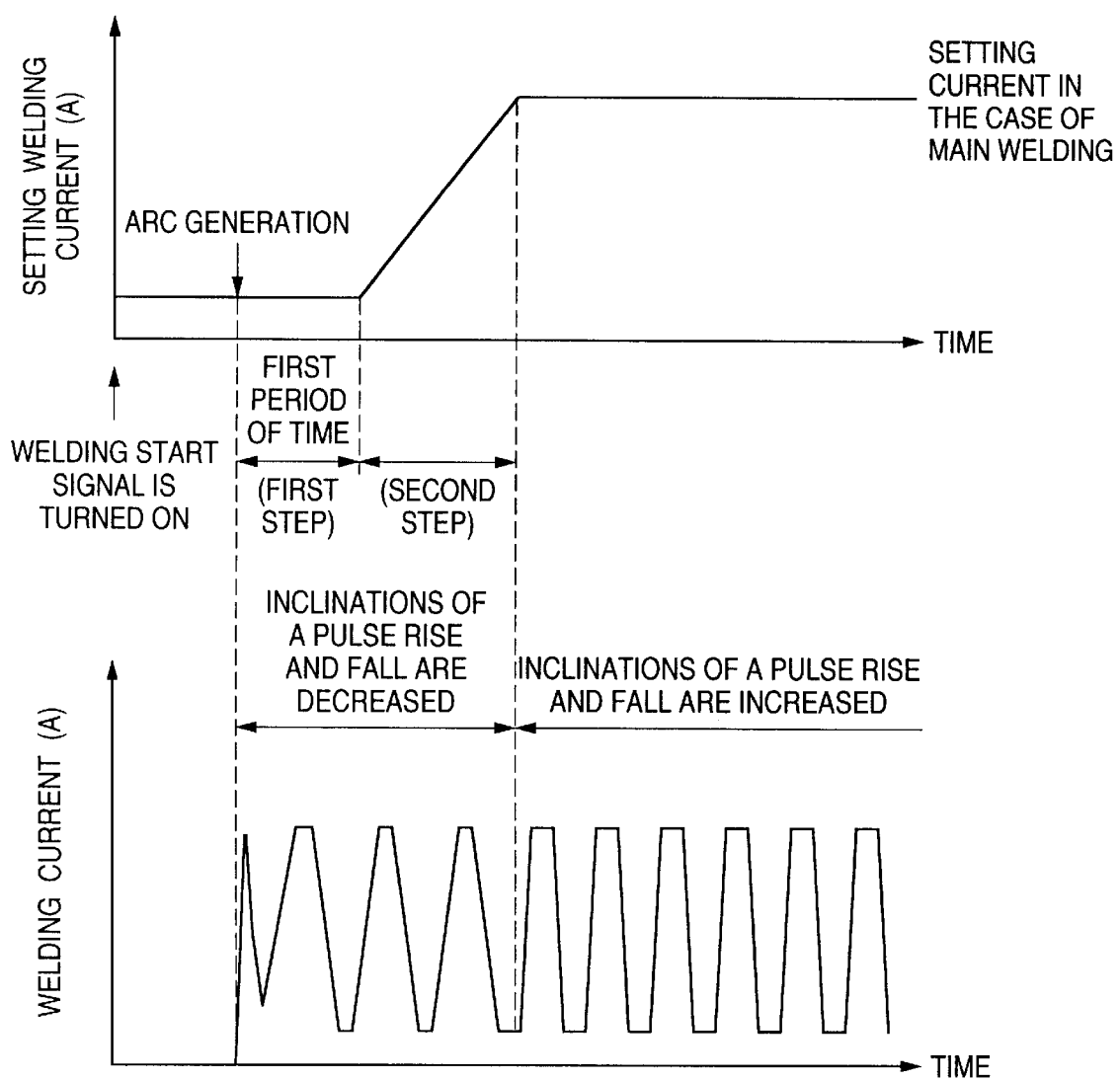
FIG. 4 is a time chart showing a setting welding current at the start of welding of Embodiment 2 of the present invention, and a waveform of a welding current.

FIG. 3 is a flow chart showing a consumable electrode type pulse arc welding method of Embodiment 2 of the present invention. FIG. 4 is a time chart of a setting welding current, and also FIG. 4 is a diagram of a waveform of a welding current. In this case, data is set so that a change in the welding current per unit time at a rise and fall of a pulse can be not more than ±1000 A/msec in the process of waiting. Next, when a welding start signal is turned on, an arc is generated.

In this case, a first period of time is defined as a period of time from the start of the arc to a predetermined time, and a setting value of the welding current is set at a value lower than that of main welding until the first period of time has passed. This period of time is defined as a first step. A second step is defined as a period of time from a point of time at which the first period of time has passed to a point of time at which the setting value of welding is increased to a value of main welding. At the end of the second step, data of a rise and a fall of pulses is changed to data of main welding. That is, when a change in the welding current per unit time in the rise and fall of the pulse is decreased to a value not more than 1000 A/msec until the setting welding current reaches a current of main welding, it is possible to suppress the occurrence of a magnetic arc blow.

Figure 5:
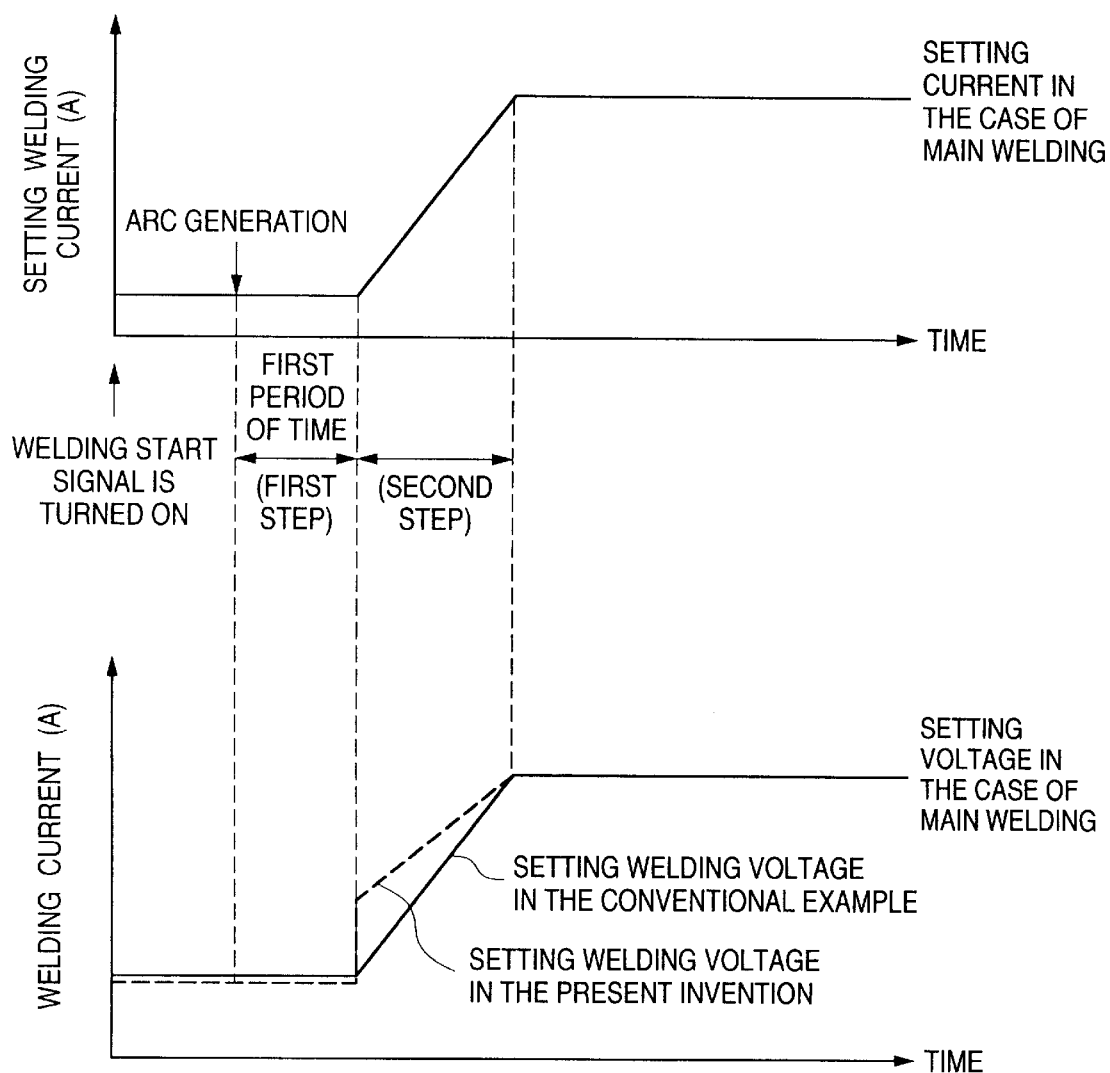
FIG. 5 is a time chart of a setting welding current and a setting welding voltage at the start of welding of Embodiment 3 of the present invention.

FIG. 5 is a time chart of the setting welding current and the setting welding voltage showing a consumable electrode type pulse welding method of Embodiment 3 of the present invention. In the second step, a predetermined value of voltage is added to a value of welding voltage which is most appropriate for each welding current and can be unitarily set, and the thus obtained welding voltage is outputted. Due to the foregoing, irregular short circuit which occurs at the start of an arc can be released in a short period of time and the occurrence of short circuit itself can be suppressed.

Figure 6:
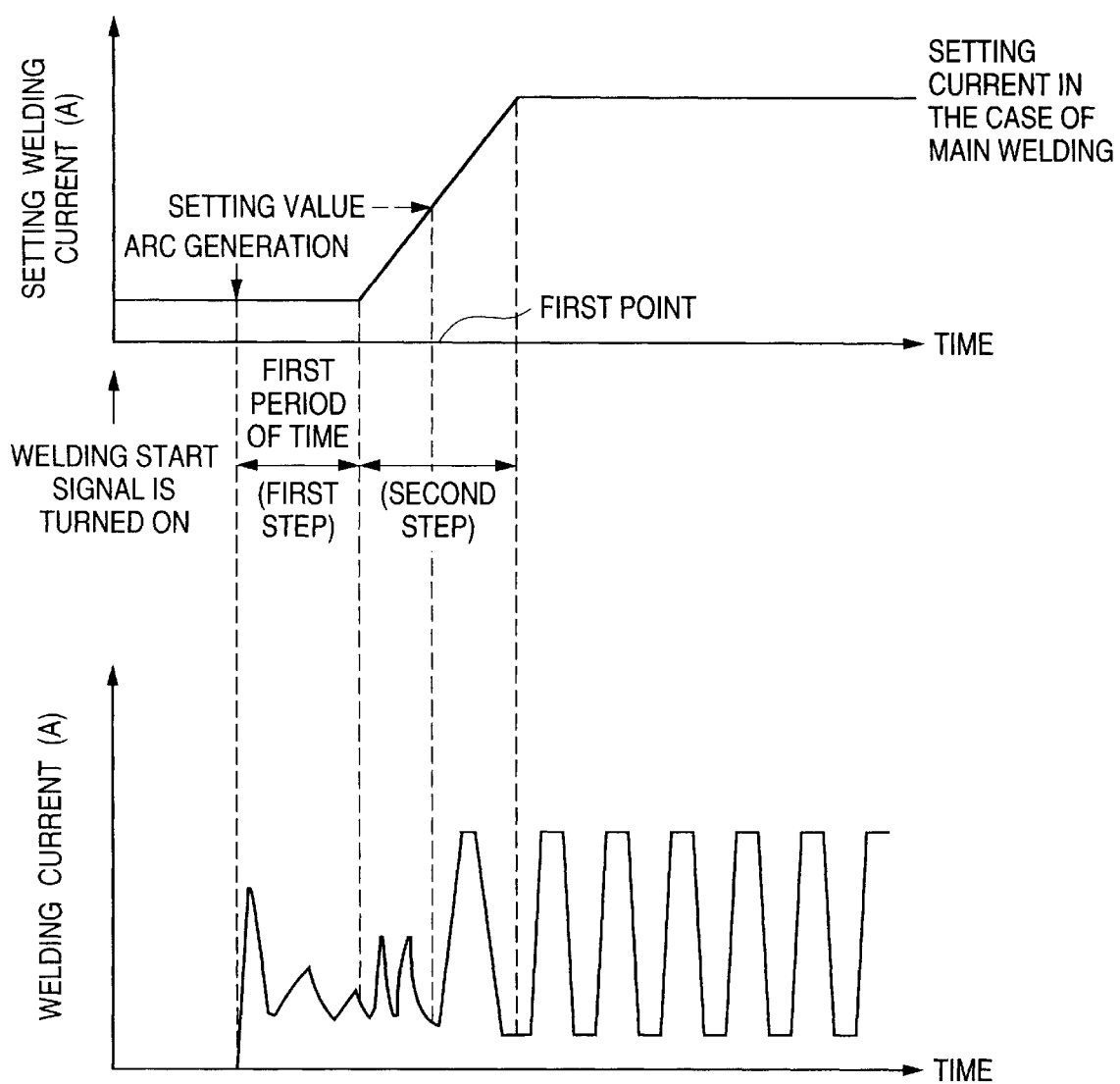
FIG. 6 is a time chart of a setting welding current at the start of welding of Embodiment 4 of the present invention, and a waveform of a welding current.
Figure 7:
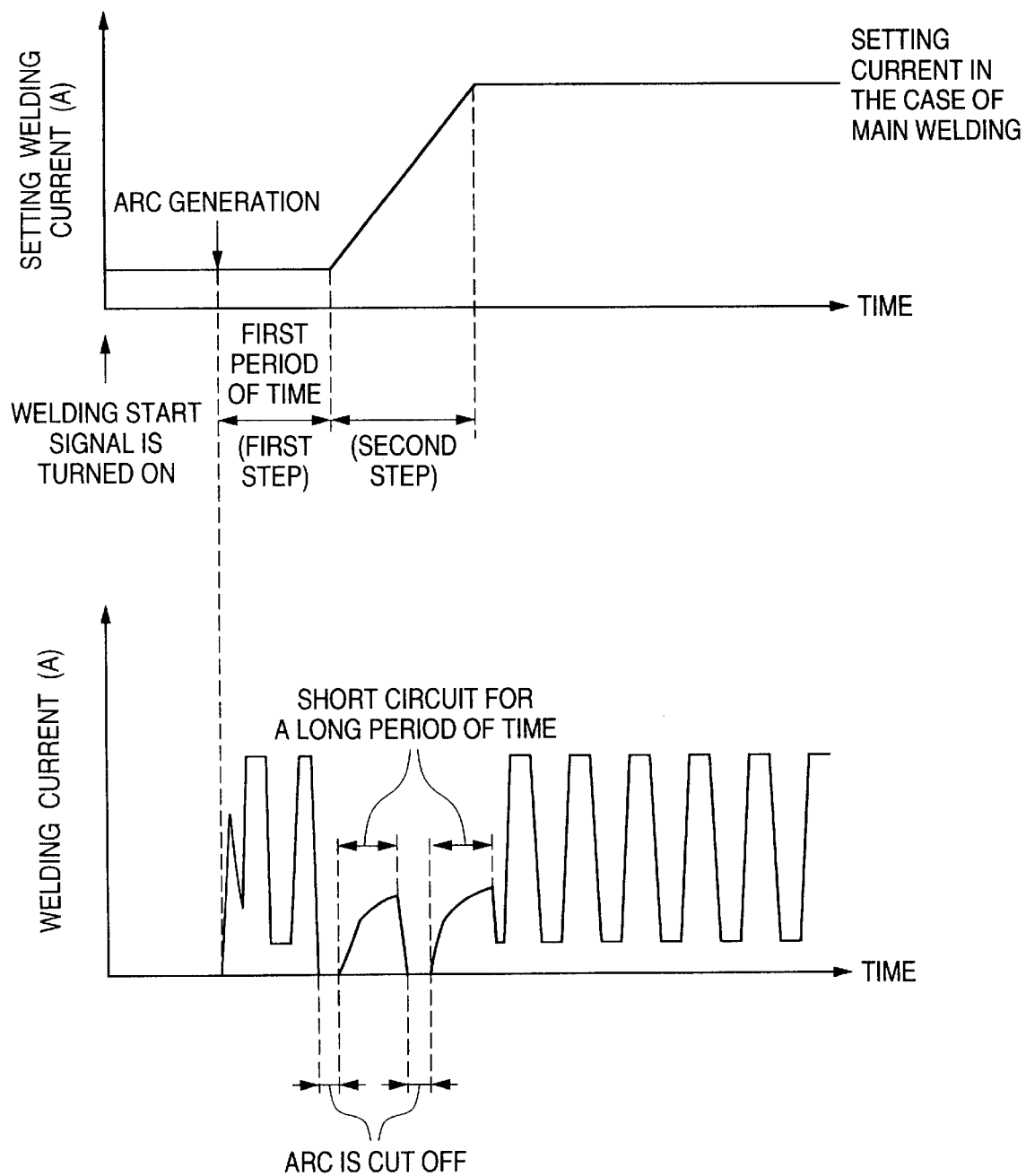
FIG. 7 is a time chart of a setting welding current at the start of welding in the case where a conventional consumable electrode type pulse arc welding method is used, with a waveform of the welding current.

FIG. 6 is a time chart of the setting welding current and the setting welding voltage showing a consumable electrode type pulse welding method of Embodiment 4 of the present invention. In the second step, after the program has passed through the first point, an inclination of pulses is decreased. Due to the foregoing, it is possible to suppress the occurrence of a magnetic arc blow. When short circuit has occurred in the second step, an inclination of the short circuit current is increased. Due to the foregoing, even if an irregular short circuit occurs at the start of an arc, it is possible to release the short circuit in a short period of time, and the arc can be prevented from cutting off.

As described above, according to the present invention, short circuit, which irregularly occurs at the start of an arc, can be released in a short period of time, so that the occurrence of a magnetic arc blow can be suppressed. Therefore, it is possible to prevent the arc from cutting off, and the arc can be stabilized early and proper beads can be formed. Due to the foregoing, welding work can be effectively performed.

What is claimed is:

1. A consumable electrode type pulse arc welding method in which at least one of the welding current and the welding voltage provides output in a pulse manner, said method comprising the steps of:

setting the welding current at an initial welding current setting value lower than that of a normal welding current setting value in a first step which is a first predetermined period of time from the start of welding;

increasing the initial welding current setting value to the normal welding current setting value during a second step which is a second predetermined period of time after the first step has passed; and preventing a pulse output from the first step to a first point which is a predetermined setting value of the welding current in the second step prior to reaching the normal welding current setting value:, wherein from the first point till the end of the second step a change in the welding current per unit time of the rise and fall of the pulse output is less than a normal change in the welding current per unit time of the pulse output.

2. A consumable electrode type pulse arc welding method in which at least one of the welding current and the welding voltage provides output in a pulse manner, said method comprising the steps of:

setting the welding current at an initial welding current setting value lower than that of a normal welding current setting value in a first step which is a first predetermined period of time from the start of welding; and increasing the initial welding current setting value to the normal welding current setting value during a second step which is a second predetermined period of time after the first step has passed;

wherein from the start of the first step to the end of the second step a change in the welding current per unit time of the rise and fall of the pulse output is less than a normal change in the welding current per unit time of the pulse output.

3. A consumable electrode type pulse arc welding method according to claim 1 or 2, wherein a welding voltage setting value is increased in the second step by a predetermined voltage value which is most appropriate for each welding current value.

4. A consumable electrode type pulse arc welding method according to claim 1 or 2, wherein a change in the short circuit current per unit time is increased in the case of a short circuit in the second step.

* * * * *